INVENTOR.
JAMES DI PERNA

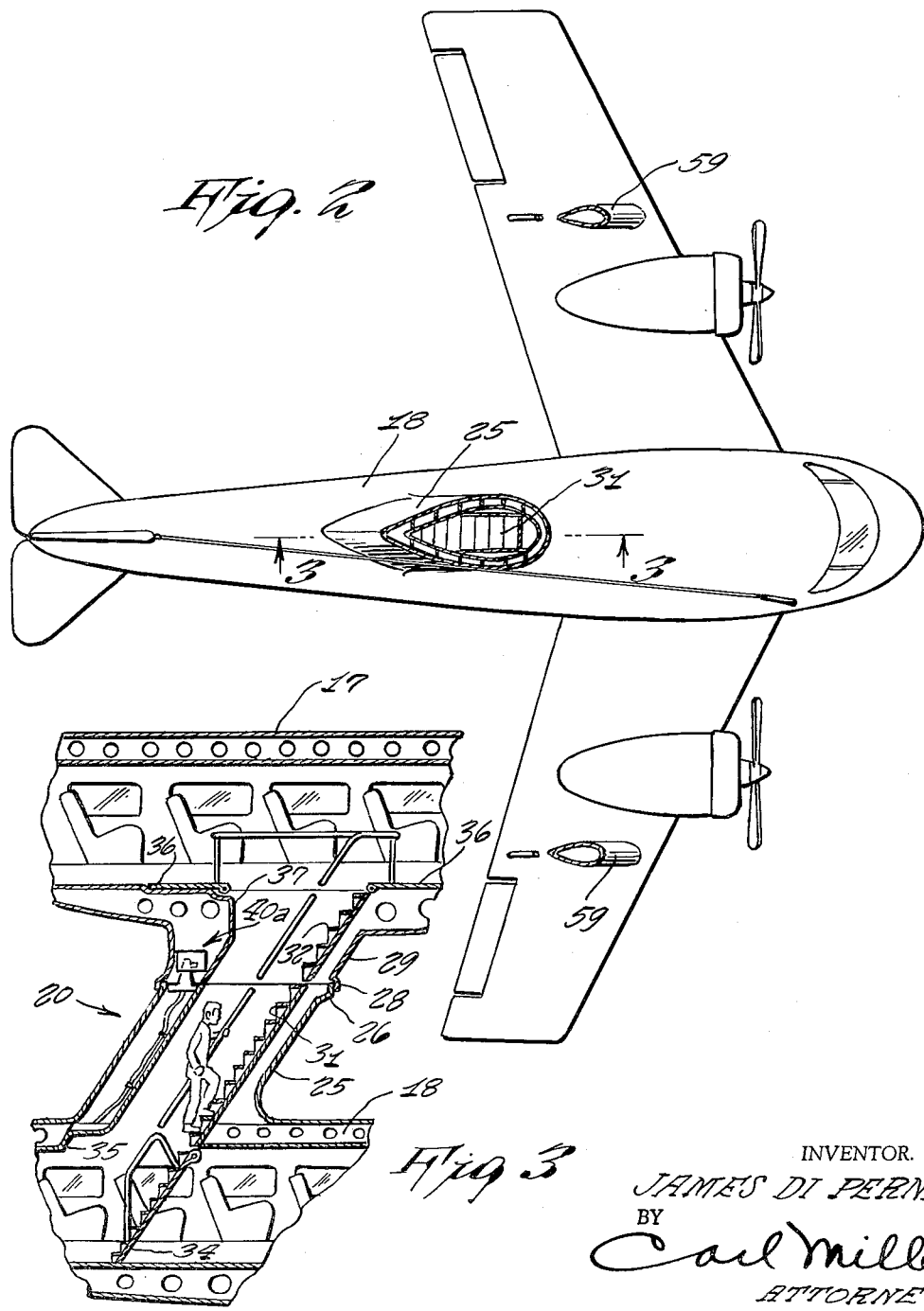

Aug. 29, 1961 J. DI PERNA 2,998,208
DOUBLE SAFETY AEROPLANE
Filed July 1, 1958 6 Sheets-Sheet 4

INVENTOR.
JAMES DI PERNA
BY
Carl Miller
ATTORNEY

Aug. 29, 1961    J. DI PERNA    2,998,208
DOUBLE SAFETY AEROPLANE
Filed July 1, 1958    6 Sheets-Sheet 5
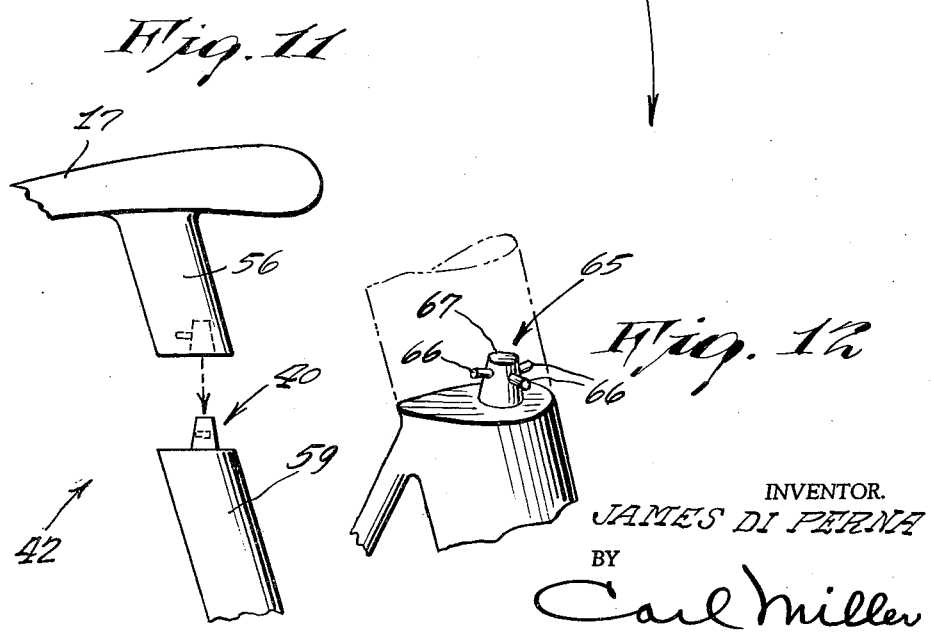
INVENTOR.
JAMES DI PERNA
BY
Carl Miller
ATTORNEY Aug. 29, 1961    J. DI PERNA    2,998,208
DOUBLE SAFETY AEROPLANE
Filed July 1, 1958    6 Sheets-Sheet 6

INVENTOR.
JAMES DI PERNA
BY
Carl Miller
ATTORNEY

United States Patent Office 2,998,208
Patented Aug. 29, 1961

2,998,208
DOUBLE SAFETY AEROPLANE
James Di Perna, 85 Fox Hills Terrace,
Staten Island 5, N.Y.
Filed July 1, 1958, Ser. No. 745,893
3 Claims. (Cl. 244—2)

This invention relates to aircraft and, more particularly to a relatively safe aircraft for commercial travel.

Ordinarily, a flash fire, engine trouble, or other mechanical failure of an aircraft results in substantial if not complete damage to the aircraft and injury if not death to the occupants. It is therefore an object of the present invention to provide a relatively safe aircraft that is particularly suited to commercial and military flight which will enable the passengers in a damaged aircraft to escape without injury and without any loss of time.

Another object of the present invention is to provide an aircraft which will more than pay for any additional costs of the safety features through complete safety of travel and elimination of injury to the passengers over a long period of time.

Still another object of the present invention is to provide an aircraft which will be more comfortable to the passengers, more spacious, which will provide assurance for a safe and carefree flight.

Still a further object of the present invention is to provide an aircraft of the type described that includes two substantially identical units having a passageway connected therebetween which will enable passengers from a damaged unit to escape into the undamaged unit for the remainder of the flight, following which escape, the damaged aircraft may be released to fall to an uninhabited area without any loss of life and without damage to ground structures.

All of the foregoing and still further objects and advantages of this invention will become apparent from a study of the following specification, taken in connection with the accompanying drawing, wherein:

FIGURE 2 is a cross sectional view taken along line 2—2 of FIGURE 1;

FIGURE 3 is a cross sectional view taken along line 3—3 of FIGURE 2;

FIGURES 9 and 10 are views similar to FIGURES 6 and 7, showing the operation of the unit when the upper plane is damaged;

FIGURE 11 shows the manner in which the wings of the upper and lower units are released;

FIGURE 12 is a perspective view of a modified form of latching structure; and

Figure 1:
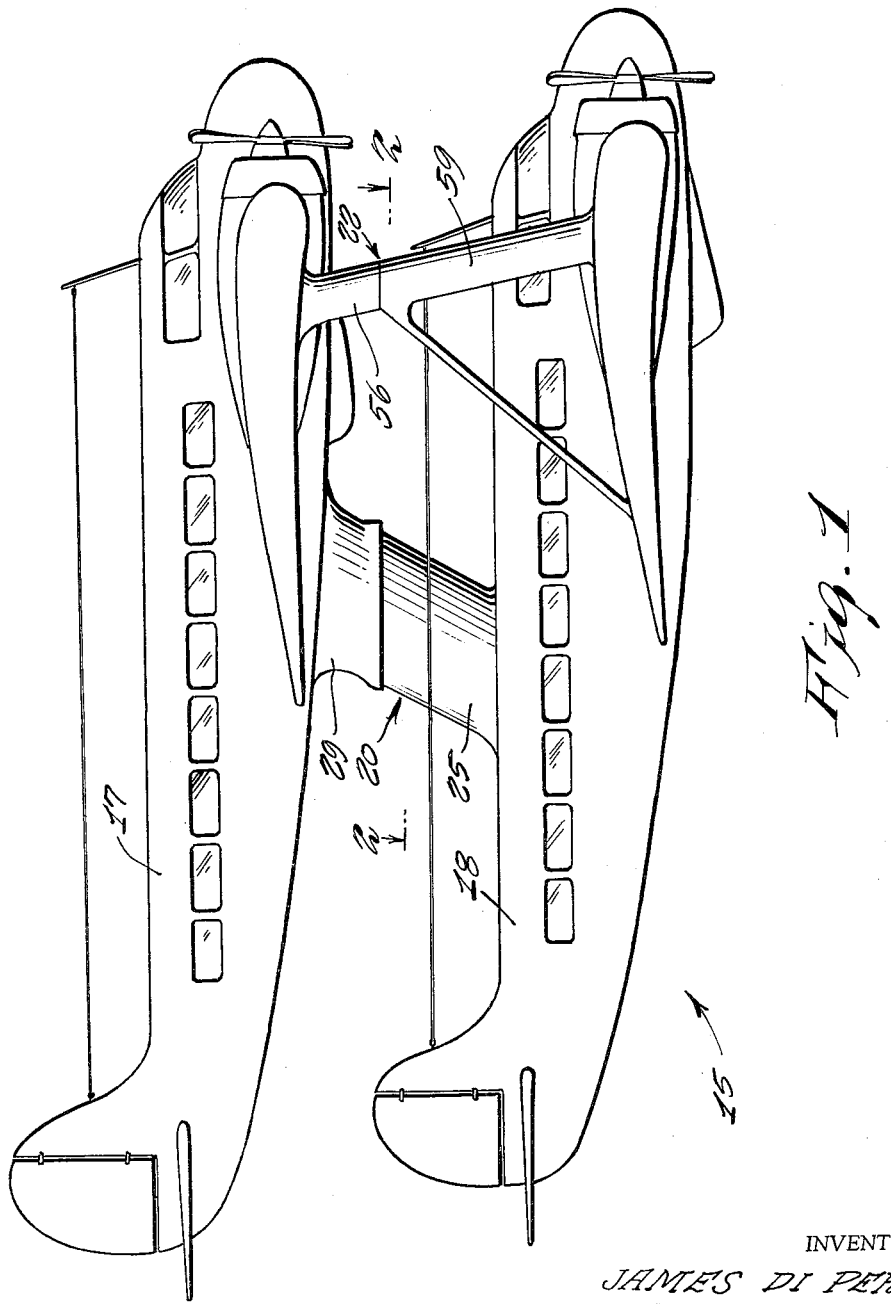
FIGURE 1 is a side elevational view of an aeroplane unit made in accordance with the present invention.
Figure 4:
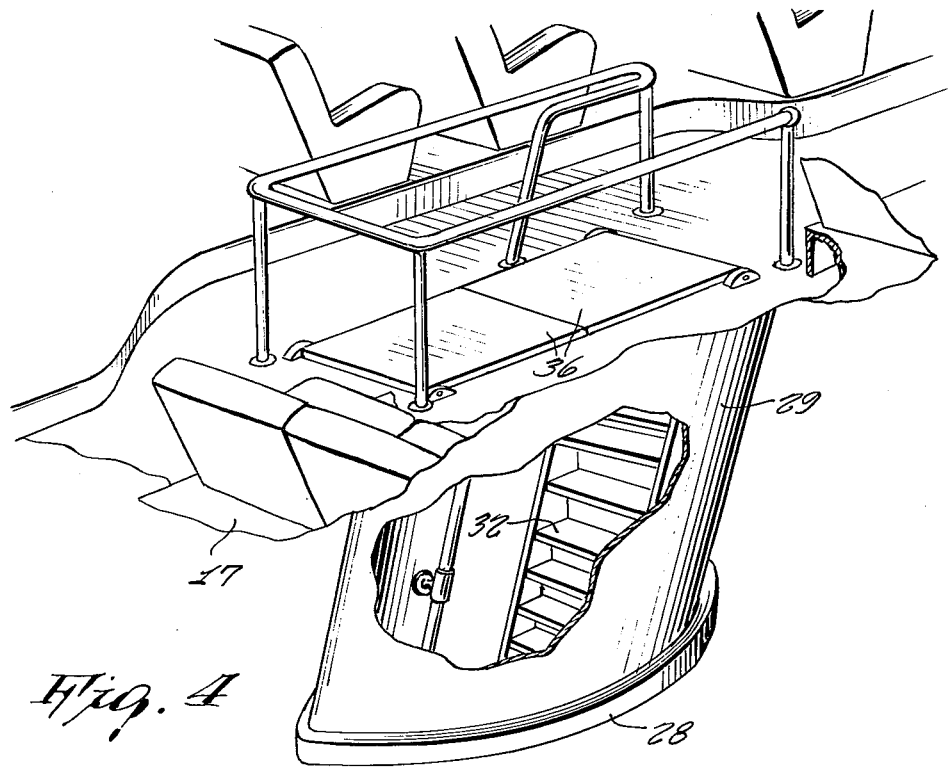
FIGURE 4 is a perspective view of certain portions of the upper plane unit.
Figure 5:
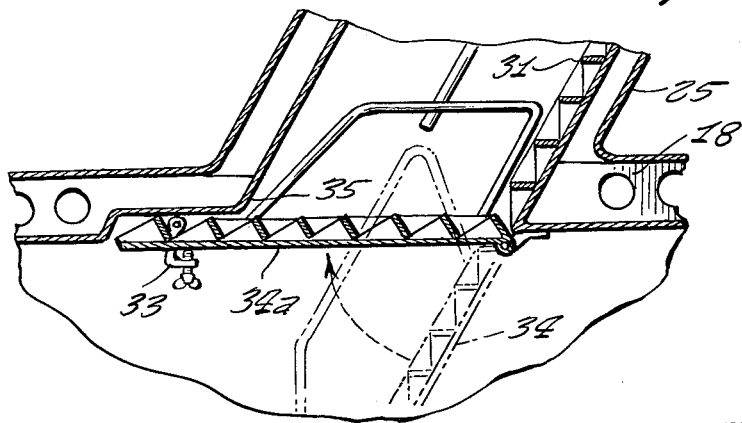
FIGURE 5 is a fragmentary view of certain parts shown in FIGURE 3, showing the access door in a closed position.

Referring now to the drawing, and more particularly to FIGURES 1 to 5 thereof, a relatively safe aeroplane unit 15 made in accordance with the present invention is shown to include an upper aircraft 17 and a lower aircraft 18 of substantially identical construction. The upper and lower units are rigidly connected together by means of a connector tube 20 that includes an upwardly extending tubular portion 25 secured to the top of the lower unit 18 and a downwardly extending tubular section 29 secured to the bottom of the upper aircraft 17. The tubular member 29 is provided with a downwardly opening enlarged flange 28 for receiving the upwardly extending flange 26 of the associated connector tube 25 so as to prevent the entry of air into the connector during flight. A section of stairs 32 in the upper tubular member 29 connects with a section of stairs 31 carried by the upwardly extending tubular section 25 so as to provide access between the interiors of the upper and lower units. The lower unit is provided with a trap door 34 having an additional section of stairs which provides a continuous flight from one plane to the other. When it becomes necessary to separate the upper and lower aircraft, for purposes hereinafter described, the door 34 may be swung upwardly about its hinge connection into a closed position with the passageway opening 35 and secured in place by means of a manually operated latch member 33 as is shown in FIGURE 5. The upper plane is provided with a set of hatch doors 36 which may be also closed, as shown in FIGURE 4, to prevent the entry of air into the opening 37 of the upper plane unit when the upper and lower aircraft are separated.

Figure 8:
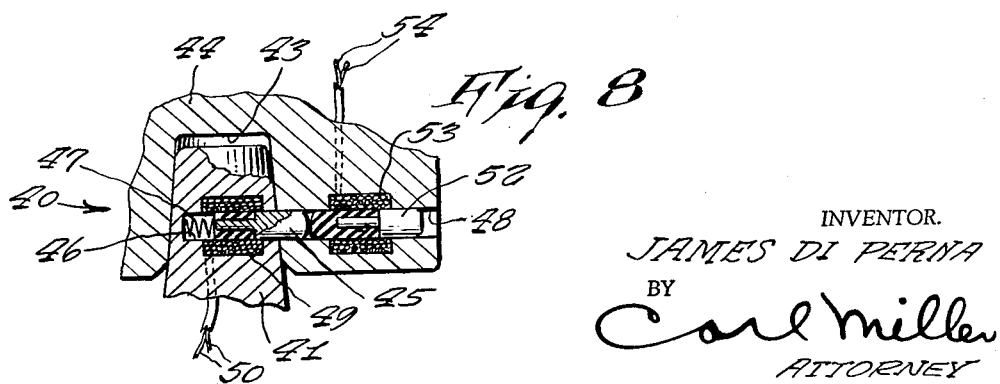
FIGURE 8 is a cross sectional view showing the details of the locking mechanism forming a part of the present invention.

As is shown in FIGURE 3, a lock or latch unit 40a secures the upper and lower tubular sections together and prevents the separation of the upper and lower aircraft units. As is more clearly shown in FIGURE 8 of the drawing, this lock 40 includes a truncated conical block 41 that is secured to the lower tubular connecting member 25 and an upper block 44 connected to the upper tubular connecting member 29 which defines a conical recess 43 for receiving the truncated conical block 41. The block 41 and block 44 are each provided with a transverse bore 46, 48, respectively, which communicate with each other when the two aircraft units are in the assembled relationship shown. A plunger 52 is slidably received within the transverse bore 48 of the female block member while a plunger 45 is slidably received in both of the transverse bores of the male and female members, thus preventing separation of these parts. A compression spring 47 normally urges the plunger 45 to this intermediate position to prevent the upper and lower aircraft units from becoming separated. An electro magnetic coil 49 encompasses the transverse bore 46 in the male block while a similar electro magnetic coil 53 encompasses the transverse bore 48 in the female block. Thus, in response to energization of the coil 49 in the male block through supply leads 50, the plunger 45 may be retracted outwardly from the bore 48 of the female block to release the parts. On the other hand, energization of the other coil 53 of the female block through supply leads 54 is operative to repell the associated plunger 52 toward the male block to dislodge the adjacent plunger 45 from its intermediate position, thereby also releasing the parts. By thus extending one set of leads 50 into the lower plane and the other leads 54 to the upper plane, energization of either coil is effective to obtain the same release condition.

This unit may also be further strengthened by means of wing struts 42 that extend between the wings of the upper and lower aircraft units. As is shown in FIGURE 11 of the drawing, each strut assembly includes a downwardly depending strut 56 secured to the wings of the upper aircraft 17 and an upwardly extending strut member 59 secured to the upper surface of the lower aircraft wing. A similar locking unit 40 may be disposed in operative association between the upper and lower strut members 56, 59, so as to be energizable simultaneously with the energization of the locking member that secures the tubular connecting portions together.

Figure 13:
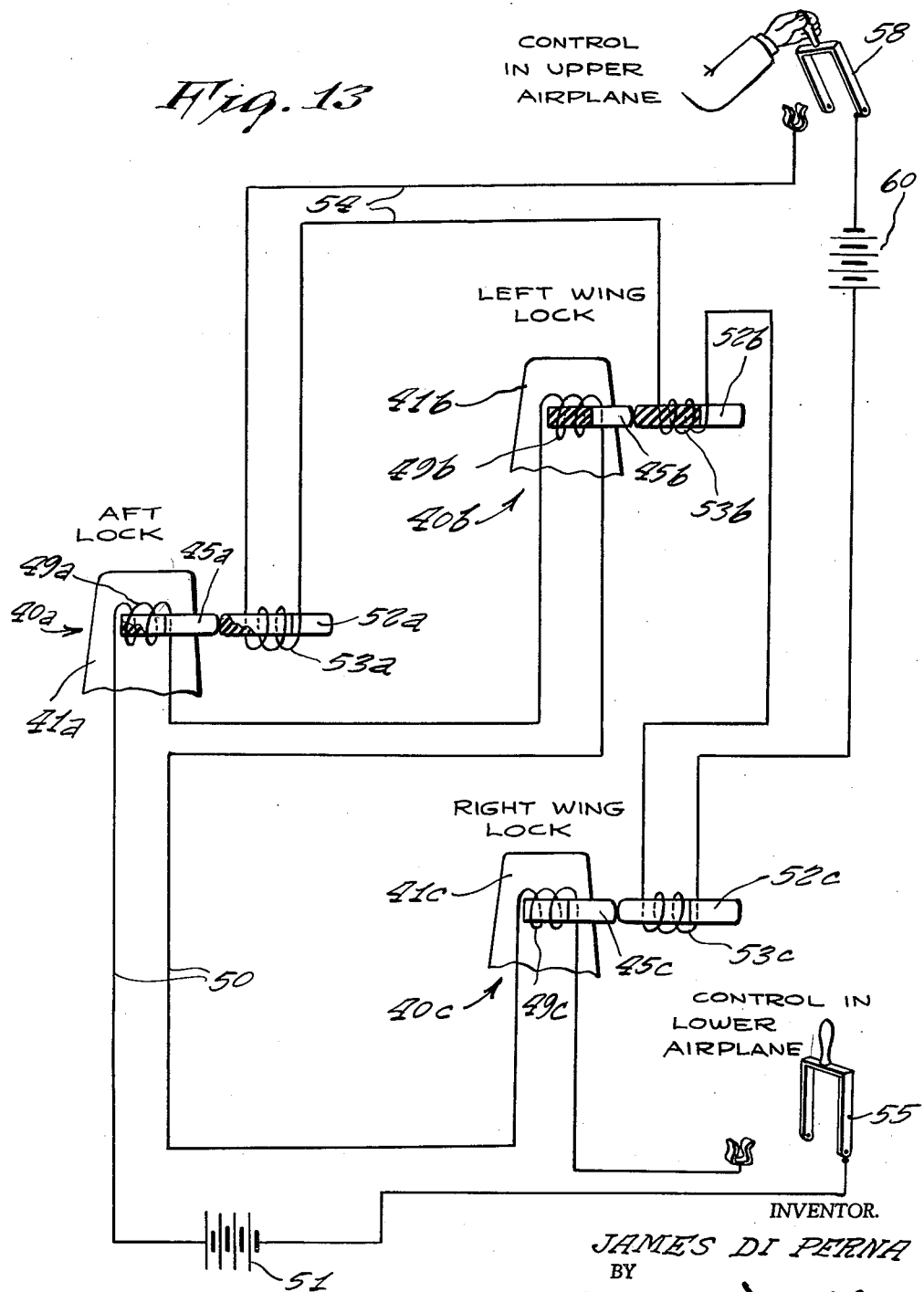
FIGURE 13 is a wiring diagram of the locking mechanism forming a part of the present invention.

Referring now to FIGURE 13 of the drawing, it will be seen that the electro magnetic coils 49a, 49b, 49c are connected in series with a storage battery 51 and manually operated switch 55 which is in the control cockpit of the lower aircraft.

Thus, in response to closing movement of the switch 55 the plungers 45a, 45b, 45c in the main connecting tube section, the left wing strut assembly, and the right wing strut assembly, respectively, will be retracted to effect the release of the aircraft. On the other hand, the electro magnetic coils 53a, 53b, 53c in the main connector tube locking unit, the left wing strut assembly, and the right wing strut assembly, respectively, are also connected in series with another battery 60 and manually operated switch 58 in the cockpit of the upper aircraft to energize the respective plungers 52a, 52b, 52c to effect the release of the aircraft in a very similar manner. Thus, means are provided for separating the aircraft from either the upper or lower unit.

Figure 6:
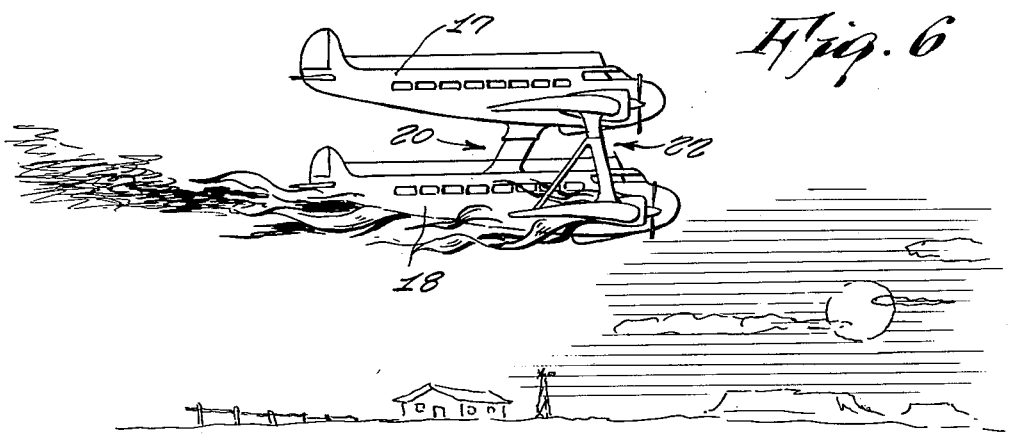
FIGURES 6 and 7 illustrate the operation of the device wherein the lower aircraft is damaged.
Figure 7:
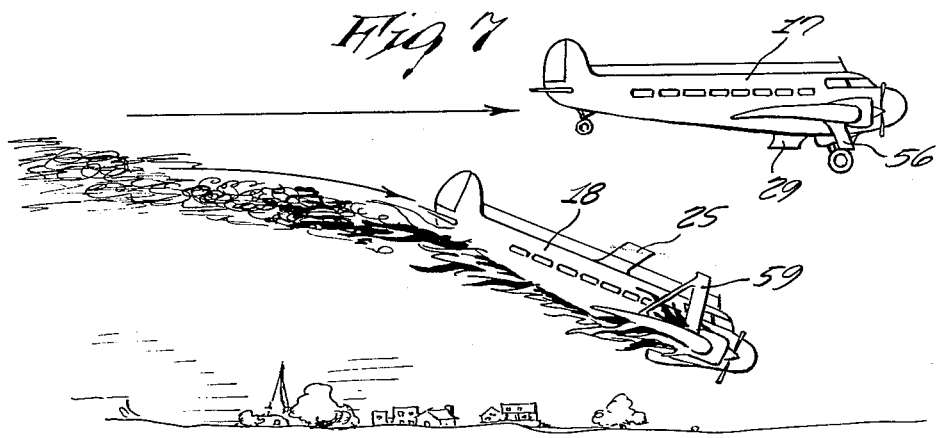

In actual use, as shown in FIGURES 6 and 7, in the event that the lower aircraft unit becomes damaged, all of the passengers therein may escape upwardly through the connecting tube unit 20 into the upper aircraft 17, following which the hatch doors 36 are closed and the switch 58 closed to energize the respective latching members to release the lower aircraft 18 which may be directed into an uninhabited area. Of course, all of the passengers in the upper aircraft 17 will continue the flight and the upper aircraft can be landed safely at the nearest field.

In FIGURES 9 and 10 of the drawing, the lower aircraft 18 may continue in flight in the event that the upper unit 17 is damaged and must be released for permitting the lower unit 18 to continue in flight.

In FIGURE 12 of the drawing, a modified form of lock construction 65 is shown wherein the male lock member 67 is provided with a plurality of outwardly projecting plungers 66 which more securely hold the parts together. All of the electro magnetic coils of these plungers 66 may be connected in series so that they are operative to disengage the respective parts in response to the closing of the control switch 58, 55.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. A safety aircraft comprising, in combination, a completely self contained upper aircraft and a completely self contained lower aircraft connected together in vertically spaced apart and substantially parallel relationship, releasable means securing said upper and lower aircraft together in said relationship, a passageway communicating with the interior of said upper and lower aircraft, said passageway comprising an upwardly extending tubular member carried by the top of said lower aircraft and a downwardly extending tubular member carried by the bottom of said upper aircraft having an enlarged flange for receiving the top of said tubular member of said lower aircraft, said releasable means for securing said upper and lower aircraft together comprising a selectively operated assembly latch for locking said upper and lower tubular members together, electrically energized means for actuating said assembly latch means from both of said upper and lower aircraft, each of said upper and lower aircraft including a left wing and a right wing, cooperating struts extending vertically between said respective wings of said aircraft units into releasable engagement with each other, selectively releasable strut latch means normally securing said cooperating struts together, said strut latch means comprising electrically energized means, means for actuating said electrically energized means in both said upper and lower aircraft, each said assembly and strut latch means comprising a male member carried by said lower aircraft, a female member carried by said upper aircraft for receiving each said male member, said cooperating male and female member having a transverse bore in alignment with each other when said aircraft are secured together, a plunger slidably supported in each said female bore, a plunger in each said male bore normally extending partially into said female bore and locking said male and female members together, and means energizable on both said upper and lower aircraft for repelling said male plungers from said female bores.

2. A safety aircraft as set forth in claim 1, wherein said energizable means comprises electro magnetic means connected with each said male plunger and said female plunger, and a spring normally urging said male plunger into said respective bore.

3. A safety aircraft as set forth in claim 2, wherein said electro magnetic means encloses with all of said male plungers and are energizable from said lower aircraft, and the electro magnetic means enclosing all of said female plungers and are energizable from said upper aircraft.

References Cited in the file of this patent

UNITED STATES PATENTS

| | | |
|---|---|---|
| 986,431 | Bideaux | Mar. 14, 1911 |
| 1,603,688 | Hall | Oct. 19, 1926 |

FOREIGN PATENTS

| | | |
|---|---|---|
| 911,457 | Germany | May 13, 1954 |